Figures 6, 7:
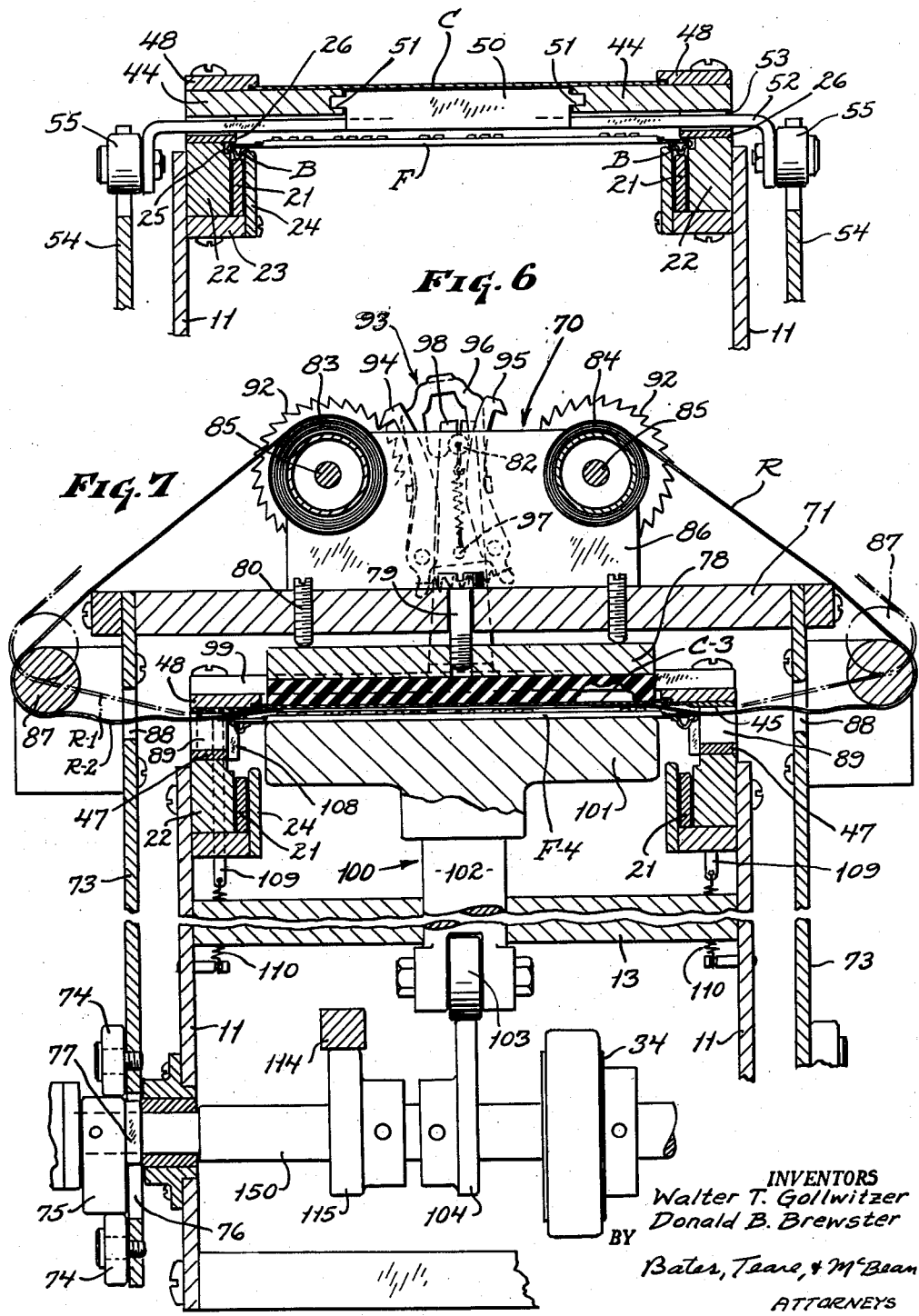

Dec. 2, 1952  W. T. GOLLWITZER ET AL  2,619,898
FEEDING, PRINTING, AND STACKING MEANS IN ADDRESS PRINTERS
Filed Feb. 16, 1946  6 Sheets-Sheet 1
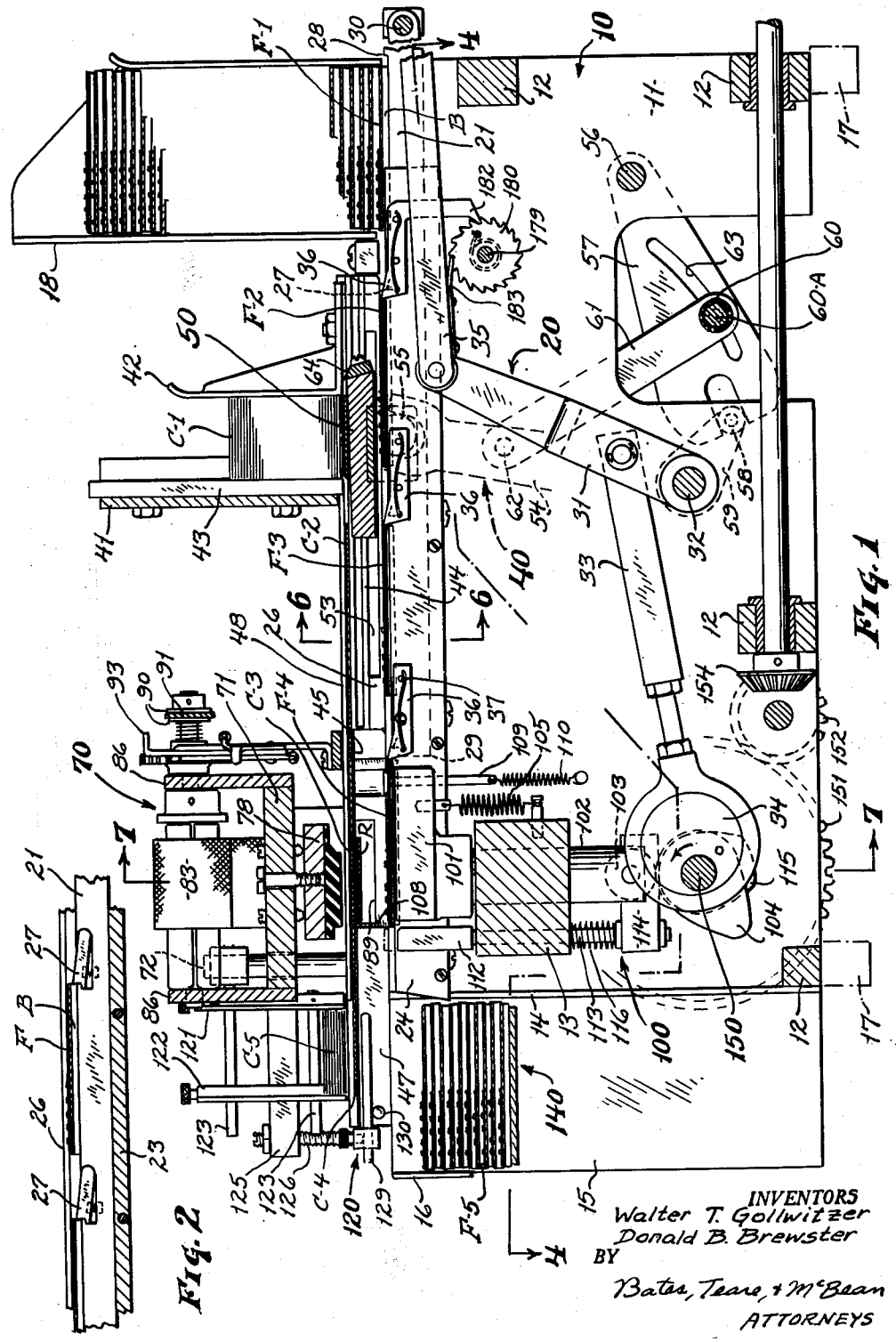
INVENTORS
Walter T. Gollwitzer
Donald B. Brewster
BY
Bates, Teare, & McBean
ATTORNEYS

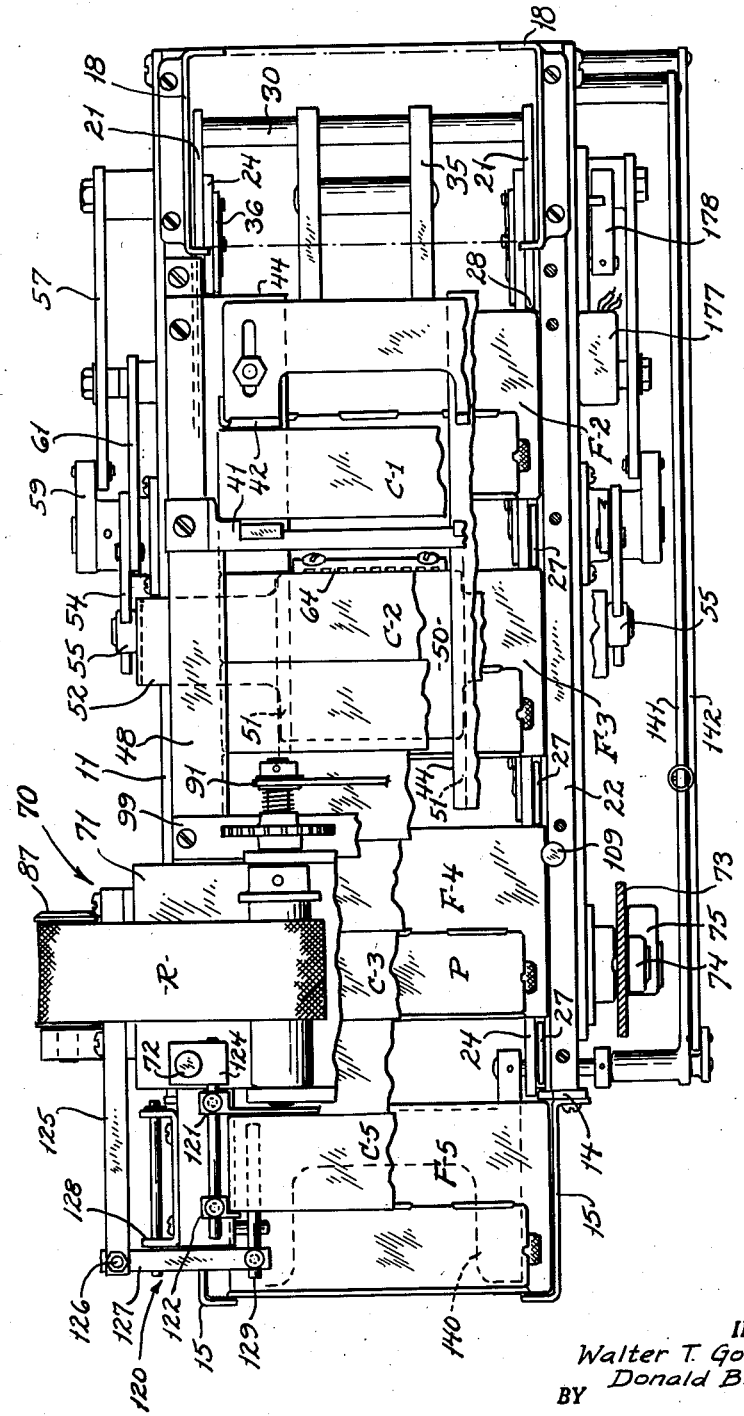

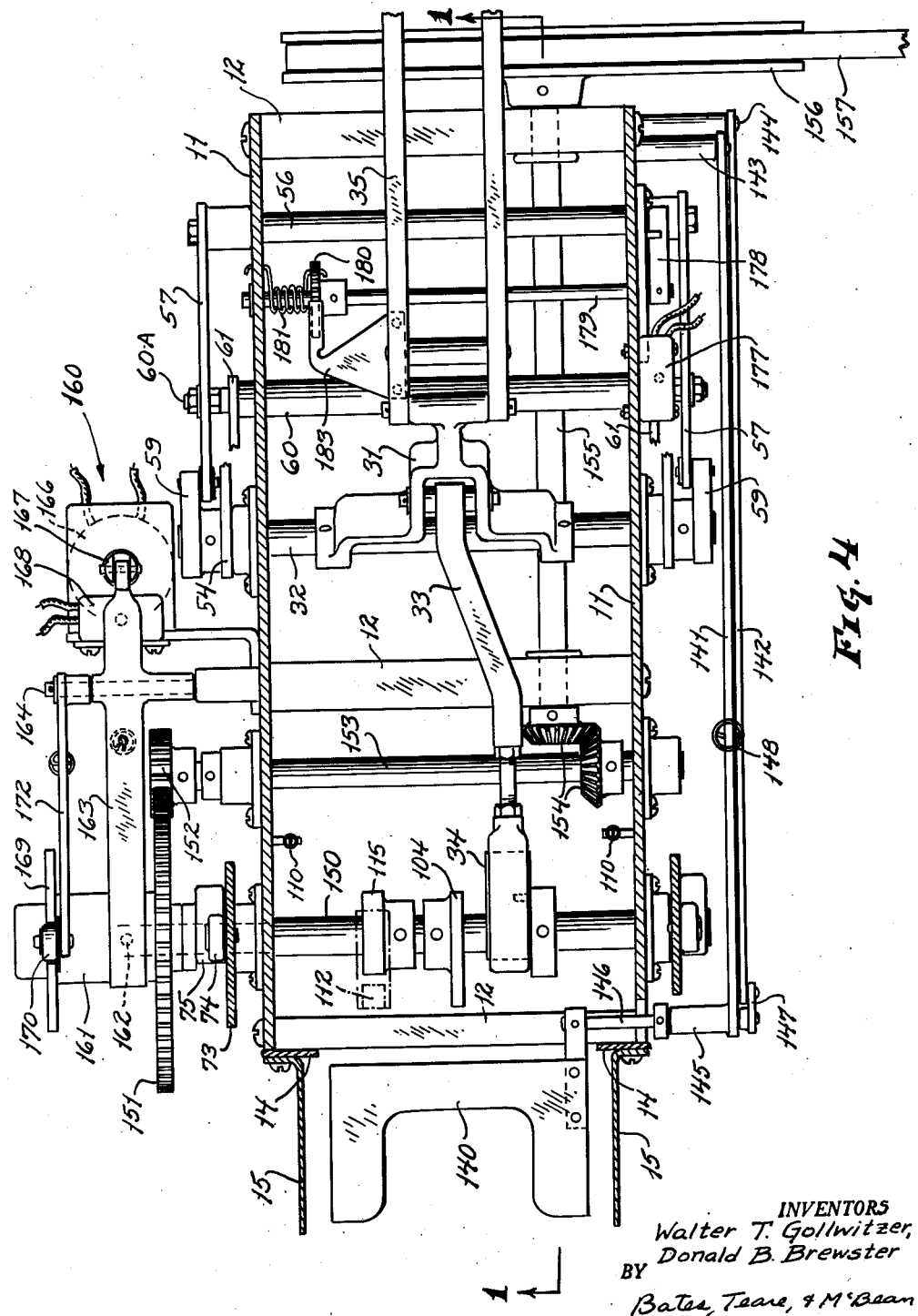

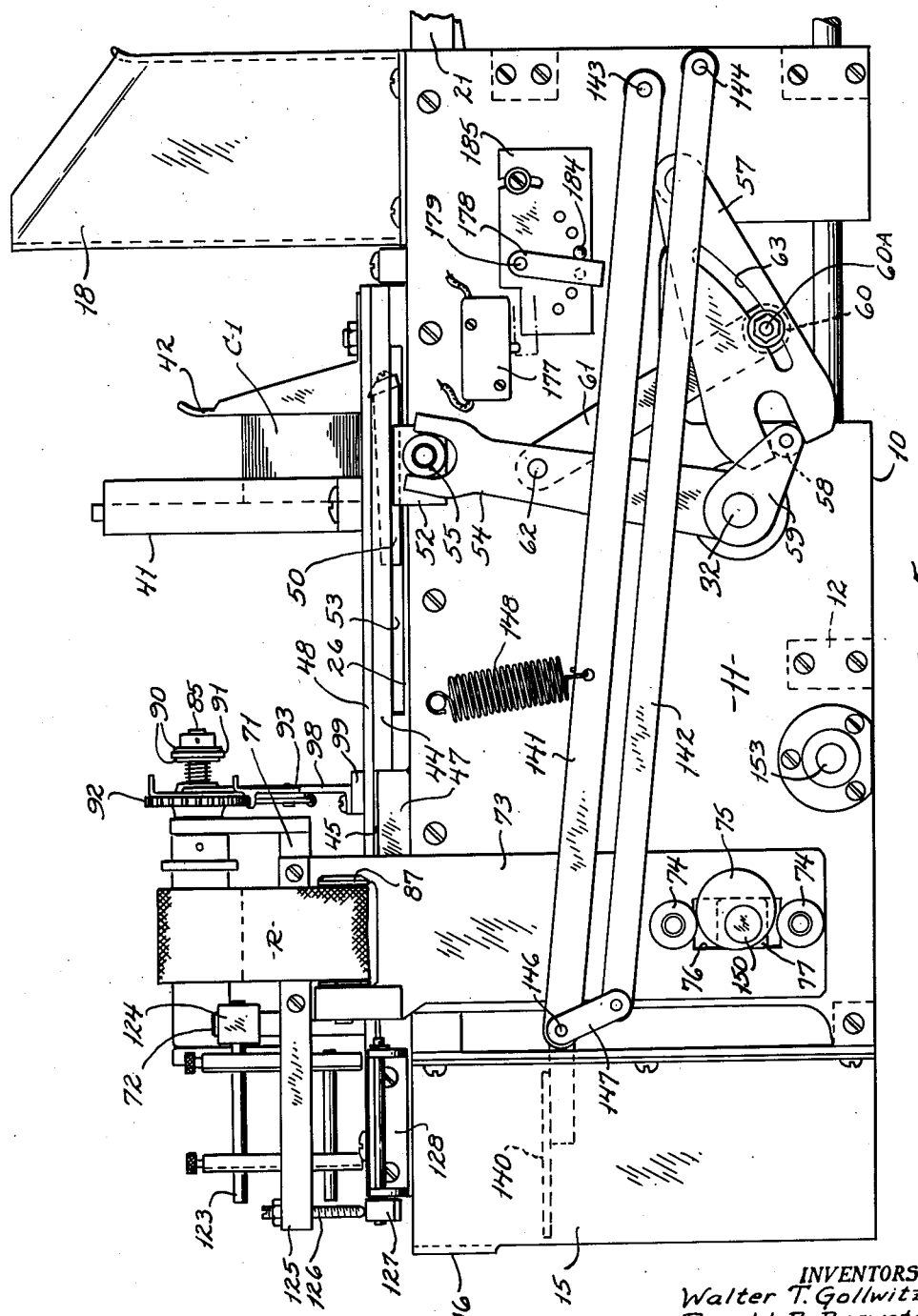

Dec. 2, 1952 W. T. GOLLWITZER ET AL 2,619,898
FEEDING, PRINTING, AND STACKING MEANS IN ADDRESS PRINTERS
Filed Feb. 16, 1946 6 Sheets-Sheet 5

INVENTORS
Walter T. Gollwitzer
Donald B. Brewster
BY Bates, Teare, & McBean
ATTORNEYS Dec. 2, 1952 W. T. GOLLWITZER ET AL 2,619,898
FEEDING, PRINTING, AND STACKING MEANS IN ADDRESS PRINTERS
Filed Feb. 16, 1946 6 Sheets-Sheet 6

INVENTORS
Walter T. Gollwitzer
Donald B. Brewster
BY
Bates, Teare, & McBean
ATTORNEYS Patented Dec. 2, 1952

2,619,898

UNITED STATES PATENT OFFICE 2,619,898

FEEDING, PRINTING, AND STACKING MEANS IN ADDRESS PRINTERS

Walter T. Gollwitzer and Donald B. Brewster, Euclid, Ohio, assignors to Addressograph-Multigraph Corporation, Cleveland, Ohio, a corporation of Delaware Application February 16, 1946, Serial No. 648,076

8 Claims. (Cl. 101—57)

This invention relates to a machine for printing a succession of cards individually from a succession of printing members such as address plates. Address plates are in wide use comprising a frame, a plate carried thereby embossed with printing characters and reading from right to left and an index card portraying matter corresponding to the printing plate but reading in the normal direction from left to right. A specific object of this invention is to provide means for printing cards suitable for mounting on the address plate frames from the printing plate while mounted in the frame. Furthermore, it is an object of the machine to deliver the carrying frames following the printing operation and the printing cards into different stacks but each in the same order so that the attendant in mounting the cards on the frames need merely mount the first card in the first frame and so on, throughout the supply of cards and frames.

It is still another object of the invention to provide simple and effective means for furnishing the ink for the imprint by means of an inking ribbon so controlled that very clear imprints may be made through the ribbon by a direct stroke at each printing impression.

Other objects accomplished by the invention will become clear from the following description of a preferred embodiment of the machine illustrated in the drawings.

Figure 8:
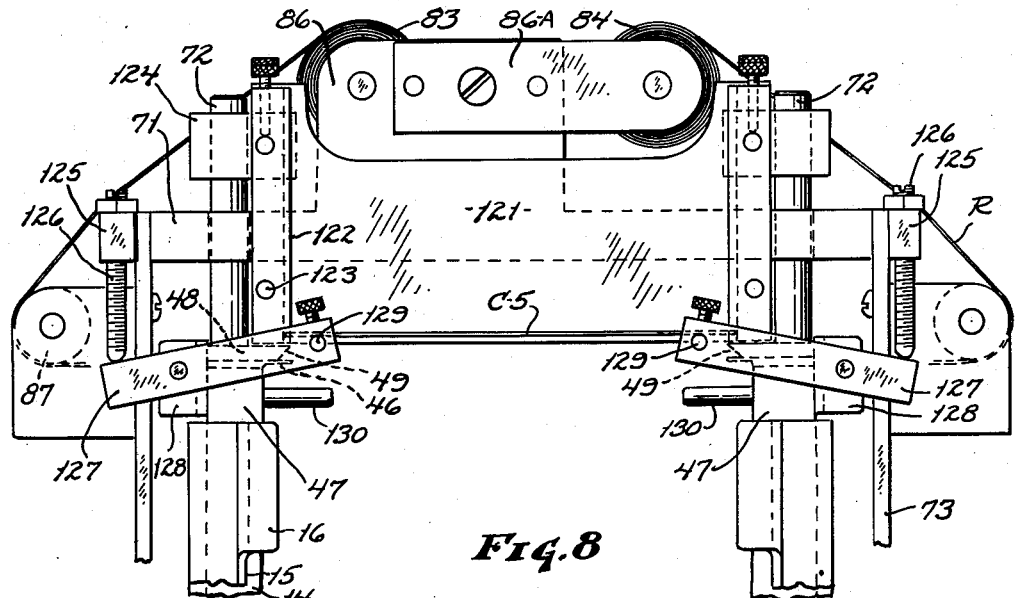
Figure 9:
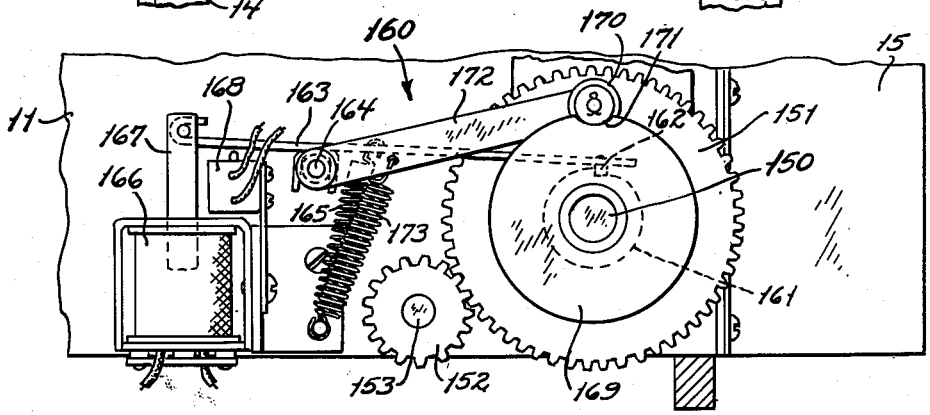
Figure 10:
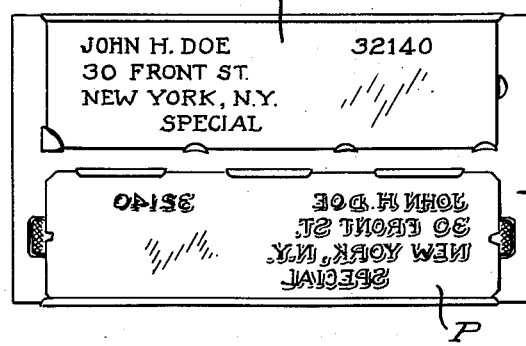
Figure 11:
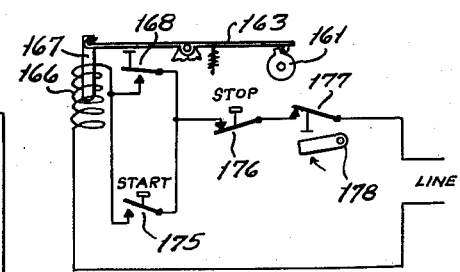

In the drawings, Fig. 1 is a longitudinal vertical section through a printing machine embodying my invention, and is taken on a plane indicated at 1—1 in Fig. 4; Fig. 2 is a fragmentary detail of some of the underlying parts in Fig. 1; Fig. 3 is a plan view with some of the parts broken away more clearly to illustrate the construction and operation; Fig. 4 is a horizontal section through the machine taken on the offset plane 4—4 of Fig. 1; Fig. 5 is a side elevational view of the machine; Fig. 6 is a fragmentary transverse section taken on the plane 6—6 of Fig. 1; Fig. 7 is a transverse section taken on the plane 7—7 of Fig. 1; Fig. 8 is a front elevation of the upper portion of the machine; Fig. 9 is an elevational view of the clutch tripping mechanism; Fig. 10 is a plan view showing the name card after it has been printed by the machine and inserted in the frame which carries the printing plate from which the card was printed; and Fig. 11 is a wiring diagram of the electrical components of the machine.

Preliminary to a description of the machine itself, reference to Fig. 10 is suggested, wherein a printing member is illustrated typical of those for which the machine is designed. A printing member of this type is fully described, for instance, in Letters Patent No. Reissue 22,249 issued January 12, 1943, to Addressograph-Multigraph Corporation, as assignee of the applicant, Walter T. Gollwitzer. Briefly, as shown, a printing plate P embossed with suitable printing indicia is carried by a frame F and held in position by suitable retainers. A name card C is carried in other retainers on the frame. This card has been printed from the associated printing plate, and hence provides an accurate indication of the embossing. Both the plate and card are readily removable when desired, but in use the whole device, called an address plate, operates as a unit.

The present invention provides a mechanism for printing such cards from the printing plate, and an operator later inserts the cards in their appropriate frames. The blank cards are placed in the machine as a stack of accurately cut blanks and, when delivered to the machine, the printing plates are already mounted upon frames.

Referring now to Fig. 1, in which is illustrated a name card printing machine embodying this invention, and referring chiefly to the main divisions, it will be seen that the base or frame 10 supports a magazine for a stack of cards at $C^1$ and a magazine for a stack of printing frames at $F^1$. A reciprocable frame-feeding mechanism, indicated generally at 20, and hereinafter described in detail, advances the lowermost frame in the stack by successive stages to a printing position at $F^4$. Simultaneously, a reciprocable card-feeding mechanism, indicated generally at 40, advances the cards by successive stages to printing position at $C^3$, directly over the positioned plate.

At the printing position is a vertically reciprocable carrier 70, carrying a platen and an inking ribbon, and beneath it, a vertically reciprocable anvil mechanism 100. At the appropriate time in a cycle of the machine, the platen is lowered against the card $C^3$, slack is provided in the inking ribbon, and the anvil raises the frame $F^4$ and its associated printing plate to cause a printing impression to be made through the ribbon onto the card. Thereafter, the frame $F^4$ is lowered, to be ejected at the start of the succeeding cycle upon a platform 140, at the position $F^5$, while the card is moved forward by the following card during the succeeding cycles to a position below a storage stack into which it is subsequently placed by a stacking mechanism 120.

During each cycle of the machine a card and a printing plate are withdrawn from their respective magazines, another card is printed from another printing plate, and still a further card and a printing plate are discharged into their respective receiving magazines. The various moving parts are driven from a single-revolution cam shaft, the clutching and declutching of which, with the power supply, is controlled by a combined mechanical and electrical control system best seen in Figs. 9 and 11, and later to be described.

Referring to the main frame 10 of the machine, it will be seen that two side plates 11 are interconnected by tie bars 12 and 13 to provide a rigid structure open at the top. A printing frame receptacle at the front of the machine comprises two vertical strips 14, best seen in Figs. 1 and 4, and a pair of forwardly extending plates 15. The plates 15 have inturned front ears 16 at their top for the proper guidance of the ejected printing plates. The machine is preferably installed in a table or similar support with the top of the main frame approximately flush with the top of the table and with the bottom resting upon, and appropriately secured to, a suitable supporting framework indicated at 17.

Referring now to the frame feed mechanism 20, the printing frames in the magazine 18 rest upon, and are advanced by, a pair of carrier bars 21 slidable in guideways at the top of the respective side plates 11. Such guideways may be formed, as is best illustrated in Fig. 6, by rails 22 which are secured to the side plates and may either be milled to accommodate the carrier bars 21 or be built up with spacing strips 23 and guide strips 24, as shown.

Still referring to Fig. 6, it will be noted that the printing frame F is formed at each end with a supporting bead B. The beads rest upon the carrier bars 21 and the rails 22 are rabbeted at 25 to accommodate the extreme end edges of the frame. The frames are confined to the resulting guideway throughout most of their travel by overhanging strips 26 secured to the rails.

The carrier bars 21 (Figs. 1 and 2) are provided with three spring-pressed pawls 27 and an upstanding shoulder 28, the shoulder standing, in idle position, behind the frame stack. The frame feed is shown in its rearmost position in Fig. 1 where it will be seen that the carrier bar terminates at 29 immediately ahead of the foremost pawl. The rear ends of the carrier bars are interconnected by a rod 30. The plate feed driving mechanism reciprocates the carrier bars by pushing and pulling upon this rod 30.

As best seen in Figs. 1 and 4, a rocker arm 31, secured to a rock shaft 32 carried in bearings in the side plates, is driven through a link 33 by an eccentric 34 secured to the single revolution shaft 150. A link 35 interconnects the upper end of the rocker arm 31 with the rod 30 secured to the carrier bars. Thus, upon a revolution of the shaft 150, the carrier bars are driven forwardly to advance the plates and then are returned to starting position.

When the frames are moved to advanced positions, (the lowermost frame in the stack by means of the shoulder 28 and the preceding frames $F^2$, $F^3$, and $F^4$ by means of the drive pawls 27) they are retained in such positions, against the action of the subsequently retreating carrier bars, by means of stop pawls 36 pivoted at 37 to the guideways. As the carrier bars withdraw from beneath the foremost plate at $F^4$, such frame rests upon the guide strips 24.

Referring now to the card feed mechanism 40, a magazine comprising a forward member 41 (Figs. 1, 3 and 5) and an adjustable rear member 42 is mounted at the top of the machine. Gauge bars 43, vertically adjustable on the forward member, allow only the lowermost card to be drawn from the stack at $C^1$. The stack rests upon, and the lowermost card slides along, a card support comprising two plates 44 secured above the respective strips 26 beforementioned. Forwardly of the plates 44, and providing a direct continuation of the upper surface thereof, is a thin strip 45, shown in Figs. 1 and 7, but better seen in Fig. 8 as having a feather edge at 46 and as being supported upon an elongated block 47.

A guideway for the cards is provided by a pair of hold-down strips 48 which are mounted immediately above, and extend throughout the entire length of, the plates 44 and the adjoining blocks 47. As best seen in Figs. 6 and 7 the strips 48 are rabbeted at their lower inner edge to accommodate the ends of the cards. At the forward end of each strip the rabbet is altered to a bevel 49, as illustrated in Fig. 8, to enable the removal of the cards upwardly, as will later be described.

The cards are moved forwardly by means of a card feed slide 50, Fig. 1. The slide is provided with side ribs which mate with guiding grooves 51 in the plates 44 (Fig. 6). Extensions 52 on the slide extend laterally through slots 53 formed in the strips 26. Reciprocation of the card slide 50 is obtained by means of rocker arms 54 at either side of the machine which are freely pivoted on the shaft 32 and are bifurcated at their tops to embrace rollers 55 carried by the slide extensions 52.

The rocker arms 54 partake of the oscillatory motion of the rock shaft 32 but in such a fashion that the length of their stroke may be altered and adapted to various widths of cars. Identical adjustable linkages are provided at each side of the machine. One of these is illustrated in Fig. 1 wherein a cross shaft 56 rigidly carries an adjustable plate 57. The plate is bifurcated at its forward end to accommodate a roller 58 on a crank 59 secured to the rock shaft 32.

As the shaft 32 is oscillated by means of the eccentric 34, the plate 57 is rocked up and down. A cross tube 60 is journaled on a rod 60A, rigidly but adjustably mounted in the plates 57, and rigidly carries a link 61 having a pivotal connection at 62 on the bifurcated rocker arm 54. The cross members 56 and 60 interconnect the linkages at either side of the machine, as best seen in Fig. 4, and preserve the alignment of the parts.

The position of the connection of rod 60A with the plate 57 may be varied to vary the length of the feeding stroke. Since the forward position of the slide 50 determines the positioning of one of the cards in registration with the printing plate at printing position, the forward limit of the stroke must be adjustable to accommodate different widths of the cards. The rearward limit, though, may remain unaltered at a point where the slide may accommodate the greatest width of card to be used. It has been found that these results may be accomplished by an arcuate adjustment slot 63 in the plate 57, the center of the arc falling upon the pivot 62 when the card slide is in its rearmost position, as shown in Fig. 1.

To remove the cards from the magazine, the card slide 50 is provided with a picker bar 64 adapted to engage only the lowermost card of the stack as the slide moves forwardly. As illustrated in Fig. 1 the slide 50 is in its rearmost position and the picker bar is ready to remove the bottom card from the stack. In Fig. 3, the slide is in its most forward position and has moved the card to the position $C^2$. The preceeding cards are thus moved forward, in edge to edge engagement, and one of them stands at the position $C^3$ in readiness for printing, while one of the cards previously printed stands at the position $C^4$ of Fig. 1 in readiness to be added to the stack $C^5$. The upper surface of the slide 50 is forwardly tapered to avoid interference with preceding cards and the picker bar 64 is rearwardly tapered to allow it to be returned beneath the stack $C^1$.

Referring now to the platen and ribbon carrier 70, best seen in Figs. 1, 7 and 8, a horizontal plate 71 is mounted for vertically reciprocatory motion on guide posts 72. The plate is supported and reciprocated through the intermediacy of legs 73 secured to the plate at their tops and each provided with a pair of rollers 74, near its bottom, which operate as cam followers in co-action with an eccentric 75 drivingly secured to the single revolution shaft 150. The shaft projects through slots 76 in the legs and is provided with positioning blocks 77 in the slots to maintain alignment of the legs. During each revolution of the shaft 150, in each cycle of operation, the platen and ribbon carrier is raised from its mid-position to its uppermost position, then lowered to its bottom position, and then back to mid-position.

The platen 78, provided with an appropriate resilient under surface, is rigidly supported beneath the plate 71 by means of a holding screw 79 and adjusting screws 80. As illustrated in Fig. 1, the platen in its idle or mid-position stands well above the cards to avoid interference therewith. During the cycle the platen is lifted still farther by the carrier, then lowered to contact the card $C^3$ at the time of printing, and then raised again into idle position.

The inking ribbon mechanism is also mounted on the carrier 70. Ribbon spools 83 and 84 are mounted on shafts 85 having bearings in brackets 86 on the carrier, one of which has a removable portion 86A (Fig. 8) to enable removal of the spool 84 to install a fresh ribbon. The ribbon R is led from the spool 83 around a guide 87 carried by the leg 73, then through a slot 88 in the leg and a slot 89 in the block 47 to pass between the card and the printing plate. It is then led out through slots 89 and 88 at the other side of the machine and around the guide 87 to the spool 84.

The spool shafts 85 are provided with spring-pressed friction discs 90 which engage a non-rotating cross bar 91. Ratchet wheels 92 are carried by each spool shaft and are operated by a ratcheting device 93, to wind and unwind the ribbon. Such device is preferably of the form illustrated in Fig. 7 wherein two pawls 94 and 95 are pivoted to a pawl carrier 96 which, in turn, is pivoted at 97 to a standard 98. The standard is mounted upon a cross bar 99 secured to the side rails of the machine frame and thus does not partake of the vertical movement of the carrier. A detent 82 restrains the pawl carrier in either of two positions whereby either the pawl 94 or the pawl 95 is caused to engage its respective ratchet wheel.

As illustrated in Fig. 7, the pawl 94 is in operation and as the carrier raises and lowers the ratchet wheel past the pawl, the ratchet wheel is intermittently turned to wind the ribbon upon the spool 83, unwinding it from spool 84 against the action of the friction brakes 91. The ends of the ribbon are secured to the respective spools so that when the spool 84 is emptied, the pawl 94 can no longer turn the ratchet wheel. During a subsequent descent of the carrier the resilient detent 82 will be overcome and the pawl carrier 96 will be snapped over to the right hand position wherein the pawl 95 engages its ratchet wheel to wind the spool 84. The ribbon is thus repeatedly transferred from one spool to the other in an efficient manner to preserve a proper distribution of the ink.

It has been found that, in a printing operation, a much clearer imprint is obtained by the use of a slack ribbon. This result is most probably due to the fact that the ribbon is not stretched tightly between the crests of one printing character and the next and is thus pressed against the imprinted surface only at the high points of the characters. This result is obtained in the present embodiment by so positioning the guides 87, Fig. 7, that their bottoms are above the tops of the slots 89 when the carrier is in its uppermost position and are substantially in line with the slots when the carrier is in its lowermost or printing position. In the uppermost position the ribbon angles downwardly from one guide, then across the machine, and then angles upwardly to the other guide. In the second position the ribbon passes in substantially a straight line from one guide, through the printing position, to the other guide. It follows that, since enough ribbon must be unwound from the idle spool to reach around the longer course, it will be slack around the shorter course. In Fig. 7, the stretched position of the ribbon is indicated at $R^1$ in broken lines while the slack position is indicated at $R^2$ in full lines.

Referring now to the anvil actuating mechanism 100, best seen in Figs. 1 and 7, an anvil or block 101 is adapted to raise the printing frame F-4, whereby the printing plate thereon is caused to make an impression through the inking ribbon R onto the card C-3. The anvil is carried by a ram 102 slidable in the enlarged tie bar 13 between the side plates 11. A cam-following roller 103 at the end of the ram is maintained in engagement with a cam 104 as by means of a tension spring 105 between the anvil and the tie bar. The cam 104 is drivingly carried by the single revolution shaft 150 and has a single sharp rise whereby the anvil is moved upwardly with a sharp printing stroke.

To allow the printing frame F-4 to be raised from its guideway, the block 47, which elsewhere overhangs the guideway to retain the frames, is at the printing position milled out, as indicated at 108, Figs. 1 and 7, to provide clearance for the rising frame.

To assure the return of the frame to the guideway after the printing operation, pull-down pins 109 are provided at each side rail 22. The pins have enlarged heads which overhang the guideway and thus are raised by the rising frame, against the action of tension springs 110 anchored to the side plates 11. As the anvil descends, the heads of the pins maintain the printing frame in engagement therewith, until the frame rests upon the guide strips 24 and the anvil continues to descend to idle and frame-clearing position indicated in Fig. 1.

A frame stop 112 is preferably provided which is periodically interposed into the path of the frames whereby the leading frame may be accurately stopped in printing position, without overthrow. The stop shown is in the form of a block having a stem 113 slidable in the tie bar 13. A cam-follower 114 is secured to the stem and coacts with a cam 115 on the single-revolution shaft 150. A spring 116, interposed between the tie bar and the cam follower, maintains the coacting engagement. The cam raises the stop 112 to the dotted line position in Fig. 1 at an appropriate time during the cycle to stop the on-coming frame, and the stop is again withdrawn previous to the return of the frame to the guideway after printing.

Referring now to the card stacking mechanism 120, an adjustable card receptacle is shown as comprising a vertical plate 121 (Figs. 1 and 8) and angle pieces 122 longitudinally adjustable along horizontal rods 123, the upper pair of rods being carried by blocks 124 secured to the guide posts 72 for the platen carrier.

Suitable mechanism is provided whereby the descent of the platen carrier operates to lift the cards from the position C-4 into the receptacle. Bars 125 are carried by, and extend forwardly from, the platen carrier and are provided with adjustment screws 126. As best seen in Fig. 8, these screws are adapted to rock a pair of levers 127 which are pivoted on brackets 128 secured to the blocks 47. The levers carry rods 129, at their inner ends, underlying the card position and normally resting upon supports 130. When the levers are rocked by the screws 126, the rods engage the card and lift it from the guideway into the receptacle. The beveled edges 49 of the strips 48 allow the ends of the cards to be withdrawn from the guideway. On passing the upper edge of the bevel, the card ends snap straight and the card, with the superimposed stack above it, if any, is supported upon the upper surfaces of the strips 48 after the rods 129 return to normal position as the platen carrier rises.

The printing frame receptacle 15 is provided with a resiliently carried platform 140 for the reception and support of the ejected frames. The support for the platform comprises a pair of parallel bars 141 and 142 (Figs. 4 and 5) extending forwardly from spaced pivots 143 and 144, respectively, at the rear of the machine. The bar 141 is provided with a bearing sleeve 145 for a shaft 146 to which the platform is secured. The other bar 142 is pivotally connected to a crank 147 also secured to the shaft 146.

Due to the length of the bars and to the parallelism between them and between the line of centers of their pivots and the crank, the platform 140 remains horizontal and has an approximately vertical path of movement. The weight of the members, and of the printing frames supported thereby, is supported by a tension spring 148 which is anchored to the side plate 11 and engages the upper bar. The spring tension is such that, as the stack of frames upon the platform increases in height, the weight thereof lowers the platform so that the top of the stack remains slightly below the level of the printing frame trackway.

Referring now to the single revolution shaft 150 and its coupling to the power supply, and referring to Fig. 4, the shaft is provided with a gear 151 which is freely rotatable thereon and in mesh with a pinion 152. The pinion is drivingly secured to a cross shaft 153 supported in bearings in the side plates 11 and driven through bevel gears 154 by a power shaft 155. The shaft 155 is provided with a pulley 156, at the rear of the machine, which may be driven, by means of a belt 157, by any suitable motor. The gear 151 constantly revolves as long as the motor is energized. The shaft 150 is drivingly connected to the gear at the will of the operator and is disconnected therefrom either at the will of the operator or automatically upon the exhaustion of the supply of printing frames, by means about to be described.

The means just referred to comprises a combined mechanical and electrical control 160 (Figs. 4 and 9) for the power connection. A clutch 161, the operating details of which are not shown, is adapted to connect the gear 151 with the shaft 150. Normally, the clutch is rendered inoperative by a pin 162 on a lever 163 pivoted to a side plate 11 at 164. The pin is retained in engagement with the clutch by a tension spring 165, Fig. 9, anchored to the side plate, but may be withdrawn by the action of a solenoid 166, the plunger 167 of which is pivotally connected to the lever. A suitable push button and proper circuits may energize the solenoid at will.

A normally open switch 168 is mounted adjacent the solenoid and in series with it electrically, whereby the switch is contacted by the lever 163 upon operation of the solenoid and, being thus closed, provides a path for the continued supply of current to the solenoid until the supply is interrupted elsewhere in the circuit. When the solenoid is subsequently deenergized the pin 162 returns to the clutch and the shaft 150 at the end of its then present revolution is disconnected from the drive.

To make certain the stopping of the shaft at the proper angular position, it is provided with a detent disc 169 having a notch 171 engageable by a detent roller 170. The roller is carried by an arm 172, pivoted at 164 to the side plate, and is forcibly held against the disc by a tension spring 173.

Referring to the diagram of Fig. 11, it will be seen that a starting button 175 is connected in parallel with the switch 168, and that the two in parallel are in series with the solenoid and with the power supply through a normally closed stop switch 176. Momentary closing of the starting switch 175 energizes the solenoid which, thereafter, continues to operate through the switch 168, as previously described. Momentary opening of the stop switch 176 de-energizes the solenoid and the holding connection is destroyed, the lever 163 returning to clutch-disengaging position.

An additional means for disengaging the clutch is provided by a normally closed switch 177 adapted to be opened by an arm 178 when the supply of frames in the magazine is exhausted. As shown in Figs. 4 and 5, the switch 177 is mounted upon a side plate 11 and the arm 178 is drivingly secured to a cross shaft 179 drivingly carrying a ratchet wheel 180. A torsion spring 181, interposed between the side plate 11 and the ratchet wheel, urges the shaft and arm in a counterclockwise direction as viewed in the drawings, until the arm engages a stop pin 184 (Fig. 5) later described.

To advance the ratchet wheel and arm 178 toward switch opening position, a ratchet driving pawl is provided in the form of a spring plate 183 secured to the link 35 of the frame feed. When the clutch is disengaged and the mechanism is in idle position, the frame feed is just short of finishing its rearward motion. Thus, at the start of a cycle the link 35 moves rearwardly to the position shown in Fig. 1 and the pawl 183 engages the ratchet wheel to move it the distance of one tooth against the action of the spring 181, carrying the arm 178 one step away from the stop pin 184.

A stop pawl 182, for the ratchet (Fig. 1) is formed as a depending portion of the rearmost frame-positioning pawl 36. When a frame is advanced from the magazine, it passes over this pawl and tips it downwardly, thus freeing the ratchet wheel. It necessarily follows that, if the stack of frames is exhausted, operation of the frame feeding mechanism will occur without the tipping of the pawl 36, and the pawl 182 will continue to hold the ratchet wheel. The ratchet wheel stays at a raised position, because of the stop pawl 182, until released by an advancing frame.

As shown in Fig. 5, a stop pin 184, adjustably positionable in a series of holes in an adjustable plate 185, determines the end position of the arm 178 when the ratchet wheel is released by the tipping pawl. During normal operation of the machine, with the clutch continuously engaged, the arm is repeatedly moved one step forward by the action of the rearwardly moving frame feed and is then allowed to return idly to the stop pin 184 as the newly fed frame trips the pawl 182.

When the supply of printing frames is exhausted it is desirable to have the machine continue through a number of cycles just sufficient to print and eject those frames which are in the guideway and to move the printed cards forwardly and up into the card receptacle. It will be noted that, in the embodiment illustrated, at the start of a cycle with an empty magazine, there are three plates to be ejected. This, of course, requires three cycles of operation. It will be noted, in addition, that there is an intermediate card position between printing at $C^3$ and storage at $C^4$. Thus, the card which is printed during the second cycle, from the third frame in the guideway, is moved to the intermediate position during the third cycle, and a fourth cycle is required to move it to storage position $C^4$. The operator may here grasp it as part of the stack, but, if it is desired to have it lifted into the stack before removal, a fifth cycle is required to operate the lifting mechanism 120.

As illustrated in Fig. 5, the mechanism is adjusted to count four cycles before disengaging the clutch; that is, at the start of each cycle, the arm 178 is raised one step and, as no more frames are being fed from the magazine, the arm remains in raised position and is moved a further step by the succeeding cycle. During the fourth cycle it engages the switch 177 and thus de-energizes the solenoid. The lever 163 is thus allowed to return to the clutch and disengages it at the end of that cycle.

After all the desired frames have been run through the machine and stored and the corresponding cards have been stored, the machine stops automatically as just described. The operator may then grasp the stack of frames between her thumb and fingers, and, after lowering them sufficiently to clear the ears 16 on the receptacle, may withdraw them. Similarly, she may grasp the stack of cards and move them upwardly and out of the card receptacle. When the stack of cards is turned over as a unit, it will be found that they are in corresponding relation to the frames and the top card may be inserted in the top plate and so on throughout the stacks with the result illustrated in Fig. 10.

It will be understood from the above description that the machine provided by this invention is adapted to be very quickly loaded with a stack of frames carrying address plates and a stack of cards the proper size for mounting in the frames and then may be rapidly operated to print the individual cards and stack them and the plate carrying frames in receptacles convenient for the operator, the operator, taking out the stack of frames and putting them on the table beside the machine and removing and inverting the stack of printed cards and placing them on the table adjacent the frames, is able with great rapidity to mount cards one after the other in their appropriate frames until every frame has received its proper card and is ready for use in the addressing machine. The card being printed from the printing plate itself necessarily corresponds thereto. The printing through a slack inked ribbon enables the impression, even though made of one stroke, to be very clear without danger of smudging between characters. The entire mechanism is adapted for embodiment in compact, comparatively small machine readily operable by a motor in any convenient position.

Reference is made to divisional application, Ser. No. 751,178 filed May 29, 1947, by the applicant, Walter T. Gollwitzer, on the ribbon inking mechanism herein shown and described.

We claim:

1. In a machine for printing cards from printing plates having embossed characters, the combination of a magazine for address plates, a magazine for blank cards, mechanism for feeding the plates one after another from the plate magazine, a guideway adapted to overhang opposite edges of the cards, mechanism for feeding the cards one after another from the card magazine along the guideway until one of the cards is directly over one of the plates and both such card and plate are in printing position, an anvil below the plate in such position, a platen adapted to stand above the card in such printing position, means for holding an inking ribbon extending between the printing plate and card, and means for lowering the platen to form a backing for the card and means for raising the anvil to lift the plate to effect an impression through the ribbon while the card is retained at its edges by the guideway.

2. A machine for printing cards from characters on address plate frames comprising a magazine for carrying the frames one above the other, a guideway leading from the bottom of the magazine, a magazine in front of the frame magazine for carrying a stack of blank cards, the bottom of the card magazine being higher than the bottom of the plate magazine and in front thereof, a guideway leading from the bottom of the card magazine forwardly over the guideway for the frames and parallel therewith, means for propelling frames and cards successively from the bottoms of their respective magazines to a registering printing position, an anvil below the frame in the printing position, a support mounted for movement up and down and above the anvil, a platen carried by said support, an inking ribbon extending across the platen, the anvil, ribbon and platen being so positioned that a card comes between the ribbon and platen and a frame between the ribbon and anvil, and means for causing said support and said anvil to approach each other to print the card in printing position from the frame in printing position while the card is retained in its guideway.

3. In a printing machine, the combination of a magazine for holding a stack of frames having printing characters thereon, a magazine for holding a stack of cards of a size adapted to be mounted on the frames without covering the printing characters thereon, reciprocable means for feeding the frames and cards by strokes of respectively different extent from their respective magazines to registering printing positions, means for causing the characters on the frame in printing position to print the card in such position, a common driving shaft and mechanism operated thereby for the frame and card feeds, and means for adjusting the stroke of the connecting mechanism between the shaft and the card feed for different sizes of cards without changing the frame feed.

4. In a machine for printing cards from frames having printing characters, the combination of means for holding a stack of frames, means for feeding frames from the stack to a printing position by successive steps and then to a discharging position, means for feeding cards to said printing position, means for causing the characters on the frame in printing position to print a positioned card, a delayed action stopping means for stopping the operation of the machine when the last frame has been fed to discharged position, and means for initiating the action of the stopping means consequent upon exhaustion of the supply of frames in the stack.

5. A machine for printing cards from characters on address plate frames comprising a magazine for carrying the frames one above the other, a guideway leading from the bottom of the magazine, a magazine in front of the frame magazine for carrying a stack of blank cards, the bottom of the card magazine being higher than the bottom of the plate magazine, a guideway leading from the bottom of the card magazine forwardly over the guideway for the frames and parallel therewith, means for propelling frames and cards successively from the bottoms of their respective magazines to registering printing positions, an anvil beneath such printing position, a platen above such printing position, means for holding a ribbon extending between the anvil and platen, all in such position that the fed plates come between the anvil and ribbon and the fed cards between the ribbon and platen, and means for raising the anvil to lift the plate into engagement with the underside of the ribbon and means for lowering the platen to press the card onto the upper face of the ribbon and thence against the characters on the plate while the ends of the cards are retained in the card guideway.

6. The method of assembling an indexed address plate, comprising taking a frame having printing characters thereon reading from right to left, printing from said frame on a blank card to produce thereon the same characters reading from left to right, accumulating the frames in a stack facing in one direction, accumulating the printed cards in a stack facing the opposite direction, then inverting one of said stacks as a whole to cause both stacks to face in the same direction, then mounting the first card on the first frame, the second card on the second frame and so on throughout the two stacks.

7. The method of assembling an address plate comprising a frame, a printing plate thereon having embossed characters reading from right to left and an index card having the same characters reading from left to right, comprising mounting the embossed printing plates on frames, feeding the frames with embossed plates thereon successively to a printing position, simultaneously successively feeding blank cards to a registering printing position, then imprinting successive cards by the embossed characters on successive plates and then stacking the cards facing in one direction in one receptacle, and stacking the frames facing in the opposite direction in another receptacle, then removing the two stacks from their receptacles and inverting one of said stacks as a whole to cause the printing plates and cards to face in the same direction, and then mounting the first card on the first frame, the second card on the second frame and so on throughout the two stacks.

8. In a printing machine, the combination of means for holding a stack of printing plates, a printing position, a guideway to guide a number of said plates from the stack to the printing position, reciprocable feeding mechanism to advance the plates one at a time from the stack onto the guideway and simultaneously advance the plates in front and bring the foremost plate to the printing position, a printing mechanism to make an imprint of the plate in printing position, operating means for said feeding and printing mechanisms, a ratchet wheel, means to advance the ratchet wheel one step for each reciprocation of the feeding mechanism, means actuated by an advancing plate to restore the ratchet wheel whereby an effective advance of the ratchet wheel occurs only when the supply of plates is exhausted and means for stopping the operation of said mechanisms after a predetermined amount of advancement of the ratchet wheel.

WALTER T. GOLLWITZER.
DONALD B. BREWSTER.

REFERENCES CITED

The following references are of record in the file of this patent:

UNITED STATES PATENTS

| Number | Name | Date |
| --- | --- | --- |
| 1,360,155 | Thompson | Nov. 23, 1920 |
| 1,562,697 | Greer | Nov. 24, 1925 |
| 1,584,020 | Duncan | May 11, 1926 |
| 1,864,075 | Lasker | June 21, 1932 |
| 1,937,145 | Gollwitzer | Nov. 28, 1933 |
| 1,993,848 | Krell | Mar. 12, 1935 |
| 1,996,954 | Elliott | Apr. 19, 1935 |
| 2,002,737 | Hartley | May 28, 1935 |
| 2,026,101 | Royster | Dec. 31, 1935 |
| 2,041,943 | McCain | May 26, 1936 |
| 2,133,136 | Gollwitzer | Oct. 11, 1936 |
| 2,151,177 | Alvine | Mar. 21, 1939 |
| 2,175,169 | Esch | Oct. 10, 1939 |
| 2,181,995 | Keil | Dec. 5, 1939 |
| 2,198,139 | Svensson | Apr. 23, 1940 |
| 2,214,796 | Ostler | Sept. 17, 1940 |
| 2,231,253 | Clark | Feb. 11, 1941 |
| 2,262,236 | Huck | Mar. 11, 1941 |
| 2,282,127 | Gabbert | May 5, 1942 |
| 2,310,179 | Kohnle | Feb. 2, 1943 |
| 2,344,345 | Elliott | Mar. 14, 1944 |
| 2,371,177 | Luthi | Mar. 13, 1945 |
| 2,412,527 | Mills | Dec. 10, 1946 |